No. 780,507. PATENTED JAN. 24, 1905.
E. W. KELLOGG.
APPARATUS FOR TESTING THE INSULATION OF COILS.
APPLICATION FILED OCT. 6, 1904.
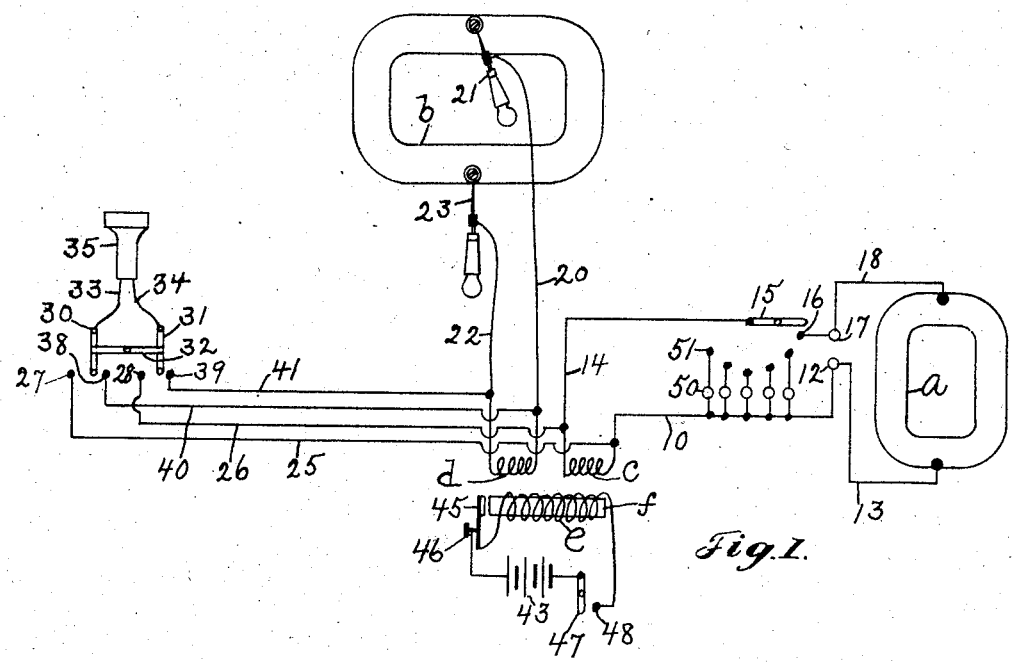
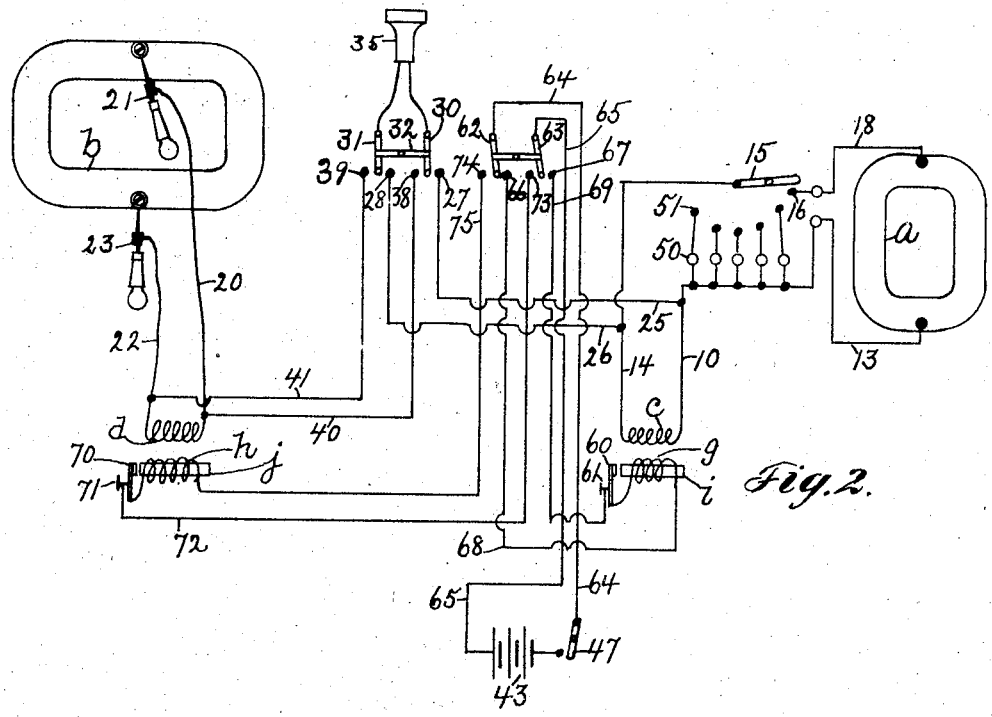
Witnesses.
C. H. Garrett
J. Murphy.
Inventor
Edmund W. Kellogg.
by Jas. H. Churchill
Atty.

No. 780,507. Patented January 24, 1905.

UNITED STATES PATENT OFFICE.

EDMUND W. KELLOGG, OF NEWTONVILLE, MASSACHUSETTS.

APPARATUS FOR TESTING THE INSULATION OF COILS.

SPECIFICATION forming part of Letters Patent No. 780,507, dated January 24, 1905.

Application filed October 6, 1904. Serial No. 227,356.

*To all whom it may concern:*

Be it known that I, EDMUND W. KELLOGG, a citizen of the United States, residing in Newtonville, in the county of Middlesex and State of Massachusetts, have invented an Improvement in Apparatus for Testing the Insulation of Coils, of which the following description, in connection with the accompanying drawings, is a specification, like characters on the drawings representing like parts.

This invention relates to a novel apparatus for testing the insulation of electric conductors, and is especially adapted for testing the insulation of electric conductors in the form of coils.

The invention has for its object to provide a simple, efficient, and inexpensive apparatus for the purpose specified.

In accordance with this invention I employ two independent circuits each of which includes the secondary winding of an induction-coil, and connect with one of said circuits an insulated coil of known or standard resistance and with the other an insulated coil whose insulation is to be tested. The primary winding of the induction-coil is included in a circuit provided with means for creating an induced current in the secondary winding, which current operates a telephone included in the second circuits, whereby the sound produced in the secondary circuit containing the unknown resistance may be compared with the sound produced in the secondary circuit containing the standard or known resistance and defects in the insulation of the tested coil noted by the difference in sound at the telephone. These and other features of this invention will be pointed out in the claims at the end of this specification.

Figure 1 is a diagrammatic view of one form of apparatus embodying this invention, and Fig. 2 a modification to be referred to.

Referring to Fig. 1, $a$ represents an insulated conductor or coil whose resistance is known and which will be hereinafter referred to as the "standard" resistance, and $b$ an insulated conductor or coil whose insulation is to be tested. The coils $a$ $b$ are adapted to be included in two independent circuits, which include secondary windings $c$ $d$ of induction-coils, which may be provided with a common primary winding $e$ and core $f$, as shown in Fig. 1, or which may have separate primary windings $g$ $h$ and cores $i$ $j$, as represented in Fig. 2.

Referring to Fig. 1, the secondary winding $c$ has one end connected by the conductor 10 to a terminal 12, which is joined by the conductor 13 to the coil $a$, the other end of said secondary winding being joined by a conductor 14 with a switch-lever 15, which coöperates with a terminal 16, joined to a terminal 17, which is connected by the wire 18 to the opposite end of the coil $a$.

The secondary winding $d$ has one end connected by conductor 20 with a portable terminal 21, which is adapted to be brought in contact with one end of the coil $b$, and the other end of said secondary winding is connected by the conductor 22 with the portable terminal 23, which is adapted to be brought in contact with the other end of the coil $b$.

The conductors 10 14 are connected by the wires 25 26 with the terminals 27 28, with which coöperate a double-throw switch comprising the levers 30 31, connected by the tie-bar 32, and to which are joined the wires 33 34, leading to a telephone 35. The levers 30 31 also coöperate with terminals 38 39, which are connected by wires 40 41 with the conductors 20 22 of the circuit including the secondary winding $d$.

The primary winding $e$ of the induction-coil is included in circuit with a battery 43, and said circuit is provided with means for inducing a current in the secondary windings $c$ $d$.

In the present instance the circuit of the primary winding includes a vibrating armature 45, which coöperates with the core $f$ and with a back-stop 46, and said circuit also contains, as shown, a switch 47, which is joined with one pole of the battery 43 and coöperates with a terminal 48, to which is connected one end of the primary winding $e$, the other end of which is connected with the vibrating armature 45. The back-stop 46 is connected with the other pole of the battery 43.

In operation with the apparatus shown in Fig. 1 the standard coil $a$ is included in circuit with the secondary winding $c$ by moving the switch 15 onto the terminal 16, and the telephone 35 is connected with said circuit by moving the switch-levers 30 31 onto the terminals 27 28. Current is then induced in the circuit of the secondary winding $c$ by closing the switch 47 in the circuit including the primary winding, which induced current operates the telephone and produces a sound therein which is indicative of the resistance of the standard coil. After this sound is noted the switch-levers 30 31 are moved so as to disconnect the telephone from the circuit of the secondary winding $c$ and are engaged with the terminals 38 39 to include the telephone in the circuit of the secondary winding $d$, and the portable terminals 21 23 are connected with the coil $b$, and the primary circuit being closed the sound produced at the telephone is noted and compared with the sound produced when the telephone is included in the circuit containing the standard coil. In this manner the insulation of the coil $b$ may be compared with the insulation of the standard coil, and any material defect in the insulation of the coil $b$ is readily noted by the difference in sound at the telephone. The circuit of the secondary winding may also have connected with it different known resistances 50, which are connected with the conductor 10 and with the terminals 51, with each of which the switch-lever 15 is adapted to be engaged to complete the circuit of the secondary winding $c$ through one of the resistances 50, in which case the standard coil is cut out and may be dispensed with, as any one of the standard resistances 50 affords a basis of comparison for the conductor being tested.

In Fig. 1 I have represented the induction-coil as composed of a single primary winding $e$ and core $f$ and two secondary windings $c$ $d$, which are included in independent circuits; but, if desired, two independent induction-coils, each composed of a primary winding, a secondary winding, and a core, may be employed, as shown in Fig. 2.

Referring to Fig. 2, the secondary winding $c$ has coöperating with it a primary winding $g$ and a core $i$, with which latter coöperates the vibrating armature 60 and back-stop 61, which are connected in circuit with the primary winding 9 and are adapted to be connected in circuit with the battery 43 by a double-throw switch comprising the connected levers 62 63, which are connected with the opposite poles of the said battery by the conductors 64 65, the former including the starting-switch 47. The levers 62 63 coöperate with terminals 66 67, with which the primary winding $g$ is connected by the wires 68 69. The secondary winding $d$ has coöperating with it the primary winding $h$ and core $j$, with which coöperates the vibrating armature 70, the back-stop 71 for which is joined by wire 72 to the terminal 73, with which the switch-lever 63 coöperates, the other switch-lever 62 coöperating with the terminal 74, which is connected by the wire 75 with one end of the primary winding $h$.

In operation with the apparatus shown in Fig. 2 the circuit through the primary winding $g$ is completed by closing the starting-switch 47 and throwing the switch-levers 62 63 onto the terminals 66 67. A current is thus induced in the secondary winding $c$ and the sound noted at the telephone, which latter is connected with the circuit of the secondary winding $c$ by moving the switch-levers 30 31 onto the terminals 27 28, which are joined by the wires 25 26 to the conductors 10 14. After the sound produced by the standard coil is noted the primary winding $g$ is disconnected from the battery 43, and the latter is connected with the primary winding $h$ by disconnecting the switch-levers 62 63 from the terminals 66 67 and connecting them with the terminals 73 74 and also disconnecting the telephone from the terminals 27 28 and connecting it with the terminals 38 39. A current is then induced in the secondary winding $d$, and the sound produced at the telephone with the coil $b$ included in circuit with the second winding $d$ is compared with the sound produced when the telephone is included in the circuit containing the standard coil.

In practice the induction-coil, the battery, and the resistances 50 and the switches may be carried by a suitable box or case. (Not herein shown.)

I have herein shown one form of translating device by which the resistance of the coil to be tested may be compared with the resistance of the standard coil; but I do not desire to limit my invention in this respect, as other forms of translating devices may be used— such, for instance, as a galvanometer.

I claim—

1. In an apparatus for testing the insulation of electric conductors in the form of coils, in combination, two independent circuits including the secondary windings of an induction-coil having a single primary winding and a core, a telephone adapted to be connected in circuit with each of said secondary windings, a source of current connected in circuit with the primary coil, and means to induce a current in the secondary windings, substantially as described.

2. In an apparatus for testing the insulation of electric conductors in the form of coils, in combination, a circuit including a standard resistance and the secondary winding of an induction-coil, a second circuit independent of the first-mentioned circuit and including the secondary winding of an induction-coil and the coil to be tested, a primary winding coöperating with each of said secondary windings, a circuit including said primary winding, means in said circuit to induce a current in each of said secondary windings, a telephone, and means to connect the telephone with each of said secondary windings, substantially as described.

3. In an apparatus for testing the insulation of electric conductors in the form of coils, in combination, a circuit including the secondary winding of an induction-coil and with which a standard resistance is adapted to be connected, a second circuit including an independent secondary winding and portable terminals adapted to make electrical contact with the coil to be tested, a telephone, means to connect said telephone with each of the secondary windings, and means to induce a current in said secondary windings, substantially as described.

4. In an apparatus for testing the insulation of electric conductors in the form of coils, in combination, a circuit including the secondary winding of an induction-coil and with which a standard resistance is adapted to be connected, a second circuit including an independent secondary winding and with which the coil to be tested is adapted to be connected, means to induce a current in said secondary windings, and a translating device responsive to the current induced in each secondary winding, substantially as described.

In testimony whereof I have signed my name to this specification in the presence of two subscribing witnesses.

EDMUND W. KELLOGG.

Witnesses:
 Jas. H. Churchill,
 J. Murphy.